Patented Aug. 8, 1933

1,921,635

UNITED STATES PATENT OFFICE 1,921,635

BLUING COMPOSITION AND PROCESS

Robert A. Phair, Allendale, N. J., assignor to H. Kohnstamm & Co., Inc., New York, N. Y.

No Drawing. Application April 19, 1929
Serial No. 356,604

5 Claims. (Cl. 8—6)

In the laundering of clothes after the actual washing operations with soap and water and stain removers followed by rinses, it is customary to add a solution of laundry blue to the water in order to neutralize the yellowish brown coloration which is caused by the action of the alkalies used on the oxycelluloses of the fabrics and to give the bluish white color so much desired. This blue solution is generally made up by dissolving about an ounce of blue in a gallon of hot water. This operation is very troublesome to the laundryman since the blue dust is very apt to fly around and spot fabrics; and also, in case the blue is not thoroughly dissolved, particles may cause blue spots on the work.

The present invention aims to eliminate these troubles by adding the bluing composition in a form which does not dust nor cause blue spots. The attraction of the ordinary liquid blue for the fabric is so great that it takes on to the fabric at once. The bluing composition of this invention takes a certain length of time to dissolve and get into action; so that the composition has time to become uniformly distributed before the attraction of the blue for the fabric is satisfied. In fact it is possible to add this dry blue directly to the clothes in the revolving wheel of the usual machine without getting blue spots on the laundered fabric.

To secure these results, I use a composition of laundry blue mixed with a diluent which retards its solution in the wash water. The blue may be mixed with the retardant by dissolving the blue in water, absorbing the solution in or adsorbing it on the retardant and then drying the product.

For example a laundry blue compound of acid blue such as No. 707 in the Colour Index may be dissolved in water, adsorbed on common salt (sodium chloride) crystals and then dried. This sodium chloride is merely in the nature of a diluent and color setter, acting as a base to hold the blue. Or the same blue may be dissolved in water, adsorbed on silex (ground silica) and then dried.

Preferably I use an ammonium salt as a carrier or diluent. Ammonium salts have the effect of setting the color and also reducing the degree of alkalinity in the wash water, the stronger sodium alkalies therein forming the sodium salt and ammonia. On ironing or on drying this ammonia evaporates, leaving the fabric in the ideal practically neutral condition.

The alkalies commonly used (sodium carbonate and sodium hydroxide for example) have a very strong fading or decolorizing effect on the blues that are used for bluing the fabric. When the blue is mixed with an ammonium salt and these usual sodium compounds have been transposed to an ammonium compound, the latter are less alkaline and have little effect on the blues; and on drying lose their ammonia and leave the goods neutral. Decolorization of the blue is substantially avoided. The background also is left whiter and this makes the color of the work a more brilliant bluish white.

A suitable composition of this character is made by dissolving one pound of acid blue and absorbing it by fifty to one hundred and twenty-five pounds of ammonium sulphate and drying.

The ammonium salt may be used as the sole diluent. Or it may be included with common salt, silex or other carrier which has not the same effect of reducing the alkalinity and rendering the goods neutral.

In using the improved bluing composition, it can be added in dry form to the water after the goods have been washed and rinsed. Six to eight ounces of the composition will usually be enough for about three hundred and fifty pounds of work; the proportion being varied according to the condition of the work and the effect desired by the launderer.

Various other modifications may be made by those skilled in the art without departure from the invention as defined in the following claims.

1. A laundry bluing composition including ammonium sulphate and a laundry blue said laundry blue being adsorbed on said ammonium sulphate in the proportion of one pound of the blue to between fifty and one hundred and twenty-five pounds of ammonium sulphate.

2. A laundry bluing composition comprising an adsorbent material and a small quantity of a soluble blue color adsorbed thereto, the amount of said color being not more than about 2% of the weight of said adsorbent material.

3. A laundry bluing composition comprising a soluble blue color adsorbed in an adsorbent medium upwards of fifty times the weight of said color, and comprising an ammonium salt.

4. A laundry bluing composition comprising a soluble blue color adsorbed on an ammonium salt upwards of fifty times the weight of said color.

5. A laundry bluing composition comprising a soluble blue color adsorbed on solid ammonium sulphate upwards of fifty times the weight of said color.

ROBERT A. PHAIR.